US011513493B2

(12) United States Patent
Feng et al.

(10) Patent No.: US 11,513,493 B2
(45) Date of Patent: Nov. 29, 2022

(54) CONTROL SYSTEM DRIVEN BY REAL TIME AND NON-REAL TIME DATA

(71) Applicants: HAN'S LASER TECHNOLOGY INDUSTRY GROUP CO., LTD., Guangdong (CN); SHENZHEN HAN'S SMART CONTROL TECHNOLOGY CO., LTD., Guangdong (CN)

(72) Inventors: Yuxin Feng, Shenzhen (CN); Yan Chen, Shenzhen (CN); Yunfeng Gao, Shenzhen (CN)

(73) Assignees: HAN'S LASER TECHNOLOGY INDUSTRY GROUP CO., LTD., Shenzhen (CN); SHENZHEN HAN'S SMART CONTROL TECHNOLOGY CO., LTD., Guangdong (CN)

( * ) Notice: Subject to any disclaimer, the term of this patent is extended or adjusted under 35 U.S.C. 154(b) by 50 days.

(21) Appl. No.: 17/258,655

(22) PCT Filed: Jul. 9, 2018

(86) PCT No.: PCT/CN2018/095027
§ 371 (c)(1),
(2) Date: Jan. 7, 2021

(87) PCT Pub. No.: WO2020/010492
PCT Pub. Date: Jan. 16, 2020

(65) Prior Publication Data
US 2021/0271223 A1  Sep. 2, 2021

(51) Int. Cl.
*G06F 12/0868* (2016.01)
*G05B 19/408* (2006.01)
(Continued)

(52) U.S. Cl.
CPC ....... *G05B 19/408* (2013.01); *G05B 19/4142* (2013.01); *G05B 19/4155* (2013.01);
(Continued)

(58) Field of Classification Search
CPC .................. G06F 12/0868; G06F 13/1663
See application file for complete search history.

(56) References Cited

U.S. PATENT DOCUMENTS 6,345,212 B1  2/2002  Nourse
2008/0276056 A1*  11/2008  Giacomoni ............. G06F 9/544
711/E12.001
(Continued)

FOREIGN PATENT DOCUMENTS

CN  102014057 A  4/2011
CN  103376772 A  10/2013
(Continued)

OTHER PUBLICATIONS

Computer Hope, "Data channel," 2017, available: https://www.computerhope.com/jargon/d/datachan.htm.*
(Continued)

*Primary Examiner* — Tracy A Warren
(74) *Attorney, Agent, or Firm* — Polsinelli PC

(57) ABSTRACT

The present application relates to a data processing method for a numerical control system, a computer device and a storage medium. The method comprises: receiving a data request, the data request carrying a target data identifier; parsing the data request to obtain an interactive type corresponding to the target data identifier; when the interactive type corresponding to the target data identifier is a type corresponding to real-time data, searching for data corresponding to the target data identifier in a shared memory of the numerical control system; transferring the data corresponding to the target data identifier from the shared memory to a data cache of the numerical control system and outputting the data.

17 Claims, 7 Drawing Sheets

(51) Int. Cl.
*G05B 19/414* (2006.01)
*G05B 19/4155* (2006.01)
*G06F 13/16* (2006.01)

(52) U.S. Cl.
CPC ...... *G06F 12/0868* (2013.01); *G06F 13/1663* (2013.01); *G05B 2219/34069* (2013.01); *G05B 2219/35001* (2013.01); *G05B 2219/35381* (2013.01)

(56) References Cited

U.S. PATENT DOCUMENTS

| | | | | |
|---|---|---|---|---|
| 2018/0024533 | A1* | 1/2018 | Zhou | G05B 19/12 |
| | | | | 711/103 |
| 2019/0022856 | A1* | 1/2019 | Kulläng | G06F 8/656 |
| 2019/0041823 | A1* | 2/2019 | Yan | G05B 19/054 |
| 2019/0235764 | A1* | 8/2019 | Lan | G06F 13/1663 |
| 2021/0279184 | A1* | 9/2021 | Yavo | G06F 9/545 |

FOREIGN PATENT DOCUMENTS

| | | | |
|---|---|---|---|
| CN | 103440302 A | | 12/2013 |
| CN | 103514261 A | | 1/2014 |
| CN | 107844524 A | * | 3/2018 |
| CN | 107844524 A | | 3/2018 |

OTHER PUBLICATIONS

Chinese Office Action dated Feb. 7, 2022 issued in corresponding Patent Application No. 201880094738.5 w/English Translation (14 pages).
International Search Report dated Apr. 3, 2019 issued in the parent application PCT/CN2018/095027 (2 pages).

\* cited by examiner

CONTROL SYSTEM DRIVEN BY REAL TIME AND NON-REAL TIME DATA

CROSS REFERENCE TO RELATED APPLICATION

This application is a National Stage of International Application No. PCT/CN2018/095027 filed on Jul. 9, 2018, entitled "DATA PROCESSING METHOD FOR NUMERICAL CONTROL SYSTEM, COMPUTER DEVICE, AND STORAGE MEDIUM", the entire content of which is incorporated herein by reference.

TECHNICAL FIELD

The present disclosure relates to the field of numerical control system technology, and more particularly, to a data processing method for a numerical control system, a computer device, and a storage medium.

BACKGROUND

Computer Numerical Control (CNC) technology is the foundation of modern manufacturing technology, integrating mechanical manufacturing technology, computer technology, group technology and modern control technology, sensor detection technology, information processing technology, network communication technology, hydraulic and pneumatic technology, photoelectric technology in one. Numerical control technology is the basis for the manufacturing industry to realize automation, flexibility and integrated production. Numerical control system is the core of numerical control technology and the key technology of numerical control development.

The conventional numerical control system has a closed structure by a specific manufacturer, and the function expansion of the numerical control system is extremely complicated and thus can only be completed by the manufacturer of the system. The transfer from one manufacturer's numerical control system to another manufacturer's numerical control system, or the upgrade of a same type of products of a numerical control system manufacturer are faced with many problems. Due to the closed structure of the conventional numerical control system, there is a problem of low data openness of the numerical control system.

SUMMARY

According to various embodiments of the present disclosure, a data processing method for a numerical control system, a computer device, and a storage medium that can improve the data openness are provided.

A data processing method for a numerical control system includes:
  receiving a data request, the data request carrying a target data identifier;
  parsing the data request to obtain an interaction type corresponding to the target data identifier;
  searching for data corresponding to the target data identifier in a shared memory of the numerical control system, when the interaction type corresponding to the target data identifier is a type corresponding to real-time data; and
  transferring the data corresponding to the target data identifier from the shared memory to a data cache of the numerical control system and outputting the data.

A computer device includes a processor and a memory storing computer readable instructions, which, when executed by the processor, causes the processor to perform the following steps:
  receiving a data request, the data request carrying a target data identifier;
  parsing the data request to obtain an interaction type corresponding to the target data identifier;
  searching for data corresponding to the target data identifier in a shared memory of the numerical control system, when the interaction type corresponding to the target data identifier is a type corresponding to real-time data; and
  transferring the data corresponding to the target data identifier from the shared memory to a data cache of the numerical control system and outputting the data.

One or more non-transitory storage medium stores computer-readable instructions, when the computer-readable instructions are executed by one or more processors, the one or more processors are caused to perform the following steps:
  receiving a data request, the data request carrying a target data identifier;
  parsing the data request to obtain an interaction type corresponding to the target data identifier;
  searching for data corresponding to the target data identifier in a shared memory of the numerical control system, when the interaction type corresponding to the target data identifier is a type corresponding to real-time data; and
  transferring the data corresponding to the target data identifier from the shared memory to a data cache of the numerical control system and outputting the data.

The details of one or more embodiments of the disclosure are set forth in the accompanying drawings and description below. Other features, purposes and advantages of the present disclosure will become apparent from the description, the accompanying drawings, and the claims.

BRIEF DESCRIPTION OF THE DRAWINGS

In order to illustrate the technical solutions of the embodiments of the present disclosure more clearly, the accompanying drawings for describing the embodiments are introduced briefly below. Apparently, the accompanying drawings in the following description are only some embodiments of the present disclosure, and those of ordinary skill in the art can derive other accompanying drawings from these accompanying drawings without creative efforts.

DETAILED DESCRIPTION

To make the purposes, technical solutions and advantages of the present disclosure be more apparent and understandable, reference will be made to the accompanying drawings and embodiments to describe the present disclosure in detail below. It is understood that the specific embodiments described herein are merely illustrative of the present disclosure and are not intended to limit the protection scope of the present disclosure.

Figure 1:
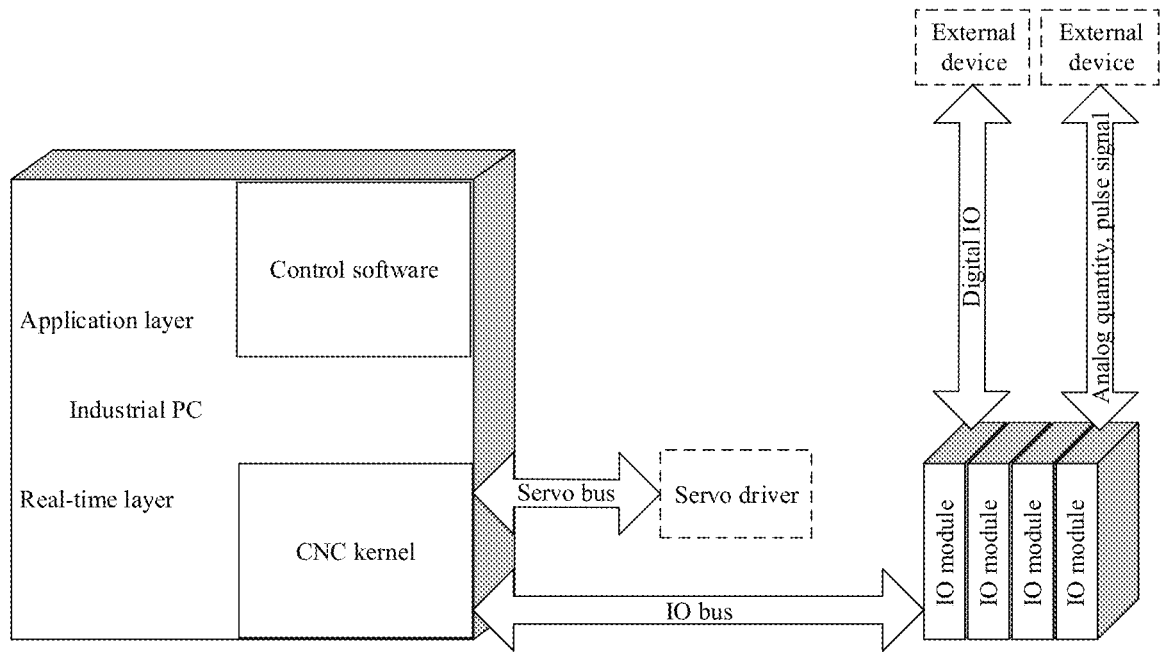
FIG. 1 is an application environment view of a data processing method for a numerical control system in an embodiment.

The data processing method for a numerical control system provided by the present disclosure may be applied to the application environment as shown in FIG. 1. A user initiates a data request through an external device, and the data request carries a target data identifier. An industrial PC of the numerical control system receives and parses the data request to obtain an interaction type corresponding to the target data identifier; when the interaction type corresponding to the target data identifier is a type corresponding to real-time data, the industrial PC searches for data corresponding to the target data identifier in a shared memory of the numerical control system; and the industrial PC transfers the data corresponding to the target data identifier from the shared memory to a data cache of the numerical control system and outputs the data. The industrial PC (Personal Computer) communicates with a servo driver through a servo bus, and communicates with an IO module through an IO (Input/Output) bus. The industrial PC includes control software and CNC (Computer Numerical Control, computer numerical control machine tool) kernel. The CNC kernel works in a real-time layer of the operating system and is mainly responsible for real-time operations such as speed planning and trajectory interpolation; the control software runs in an application layer of the operating system and is mainly responsible for functions such as human-computer interaction, graphics display, process settings, and the like. The numerical control system controls a numerical control machine tool through the data and instructions calculated by the CNC kernel and control software, and monitors information fed back by the machine tool.

Figure 2:
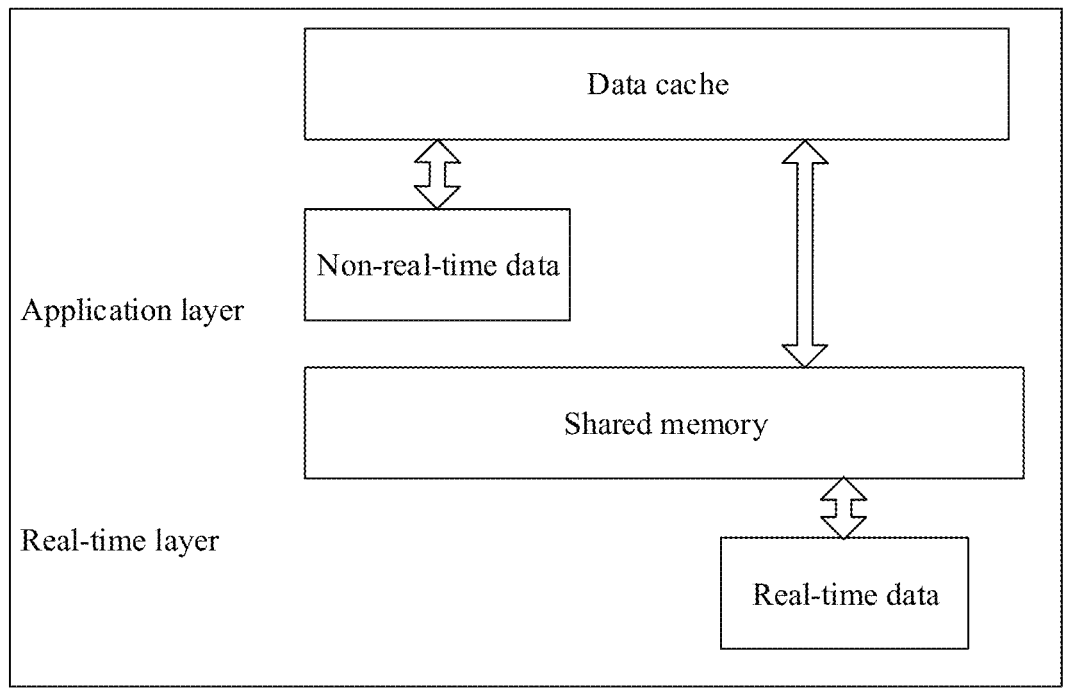
FIG. 2 is a frame diagram of data extraction and storage of a numerical control system in an embodiment.

During the operation of the numerical control machine tool, a large amount of operating and processing data is processed by the numerical control system. These data mainly include state data of the machine tool (such as emergency stop, stop, operating, ready, etc.), real-time operating data (such as position, speed, acceleration, error, etc.), processing data (such as processing time, processing type, processing quantity, etc.), and log information of the machine tool (such as warning information, startup log, etc.). If opening and sharing of the process data of the operation and processing of the numerical control system needs to be achieved, a data cache needs first to be set up to store these data. As shown in FIG. 2, since part of these data runs in the application layer of the operating system and the other part thereof runs in the real-time layer of the operating system, the data running in the application layer can be directly extracted to the data cache, while the data running in the real-time layer needs to be transferred to the application layer through shared memory before being extracted to the data cache. After the data is stored into the data cache, the external device can communicate with the numerical control system and acquire data from the numerical control system.

Figure 3:
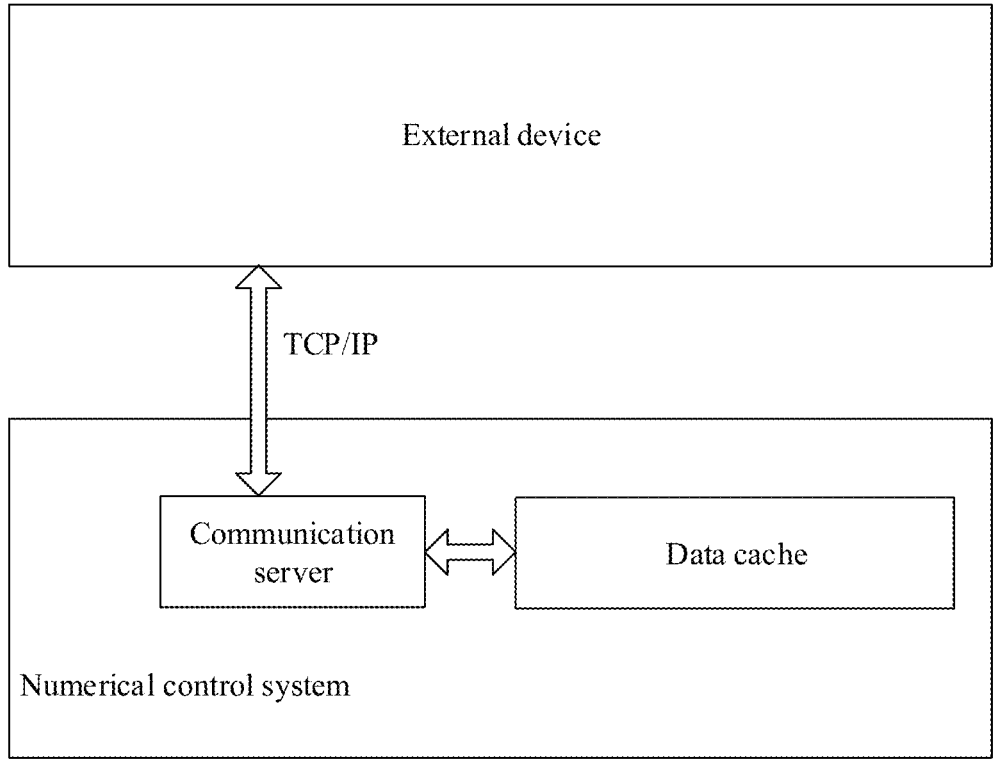
FIG. 3 is a framework diagram of communication between the numerical control system and an external device in an embodiment.

In order to be compatible with a wider range of different external devices, the standard TCP/IP (Transmission Control Protocol/Internet Protocol) communication protocol can be used to realize the communications between the numerical control system and the external devices. As shown in FIG. 3, a communication server is established in the application layer of the industrial PC operating system. An external device establishes communication with the communication server through the TCP/IP protocol to acquire the data in the data cache. The external device can be but not limited to various personal computers, laptops, smart phones, tablets and portable wearable devices.

Figure 4:
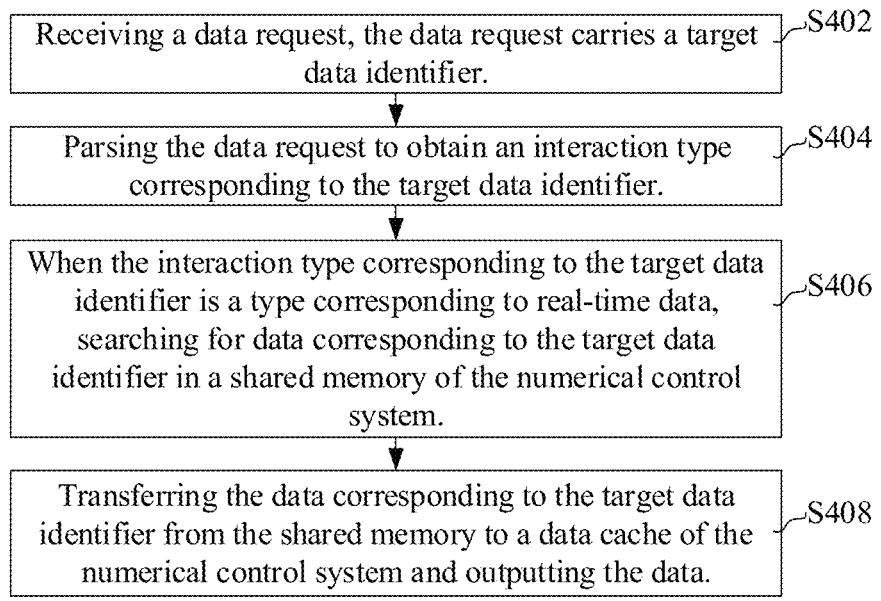
FIG. 4 is a schematic flowchart of a data processing method for a numerical control system in an embodiment.

In an embodiment, as shown in FIG. 4, a data processing method for a numerical control system is provided. Taking the method applied to the industrial PC in FIG. 1 as an example for description, the method includes the following steps:

S402, receiving a data request, the data request carries a target data identifier.

The data request refers to a task command issued by a user terminal, and the target data identifier refers to an identification mark corresponding to different data. The data request can include two categories: task execution of the numerical control system and information provision of the numerical control system. Among them, task execution of the numerical control system includes processing control, coordinate movement, positioning, etc., and information provision of the numerical control system includes provision of information such as coordinates, processing time, processing speed, or the like.

S404, parsing the data request to obtain an interaction type corresponding to the target data identifier.

The interaction type refers to whether the task command issued by the user terminal is a real-time task or a non-real-time task. The interaction type may specifically include a type corresponding to real-time data and a type corresponding to non-real-time data. For example, the numerical control system operates in a Linux operating system, including real-time kernel control and non-real-time kernel control. Among them, the real-time kernel control is completed by an RT-Linux kernel, and the object-oriented is a dedicated hardware of a numerical control machine tool; the non-real-time kernel control is completed by the Linux kernel itself, which operates in the Linux system space, and the object-oriented is a general hardware of a computer.

S406, when the interaction type corresponding to the target data identifier is a type corresponding to real-time data, searching for data corresponding to the target data identifier in a shared memory of the numerical control system.

The shared memory is a special memory region, which is a memory region used for communication between kernel space and user space. The shared memory is not a point-to-point communication channel. It supports a multi-producer and multi-consumer usage model and allows sharing among multiple threads. The shared memory region can be allocated from the kernel address space by calling a preset function, or the physical memory of the high address space can be isolated as the shared memory region.

The shared memory is isolated from the operating environment of the system kernel and can be mapped by multiple threads. Therefore, real-time data can be stored into the shared memory.

S408, transferring the data corresponding to the target data identifier from the shared memory to a data cache of the numerical control system and outputting the data.

The data cache is a memory chip on a hard disk controller, it has extremely fast access speed, and is a buffer between the internal storage of the hard disk and an external interface. Since a transfer speed of internal data of the hard disk is different from a transfer speed of the external interface, the cache can serve as a buffer. The internal data of the numerical control system and the external device can communicate through the data cache, the data corresponding to the target data identifier is transferred from the shared memory to the data cache, and the external device then extracts data corresponding to the target data identifier from the data cache.

In the above data processing method for a numerical control system, by parsing the data request, an interaction type corresponding to the target data identifier is obtained; when the interaction type corresponding to the target data identifier is a type corresponding to real-time data, data corresponding to the target data identifier is searched for in a shared memory of the numerical control system; and the data corresponding to the target data identifier is transferred from the shared memory to a data cache of the numerical control system and is output. The real-time data in the shared memory can be output through the data cache, in this way, the external device can acquire the real-time data located in the shared memory through the data cache, thereby improving the data openness of the numerical control system.

Figure 5:
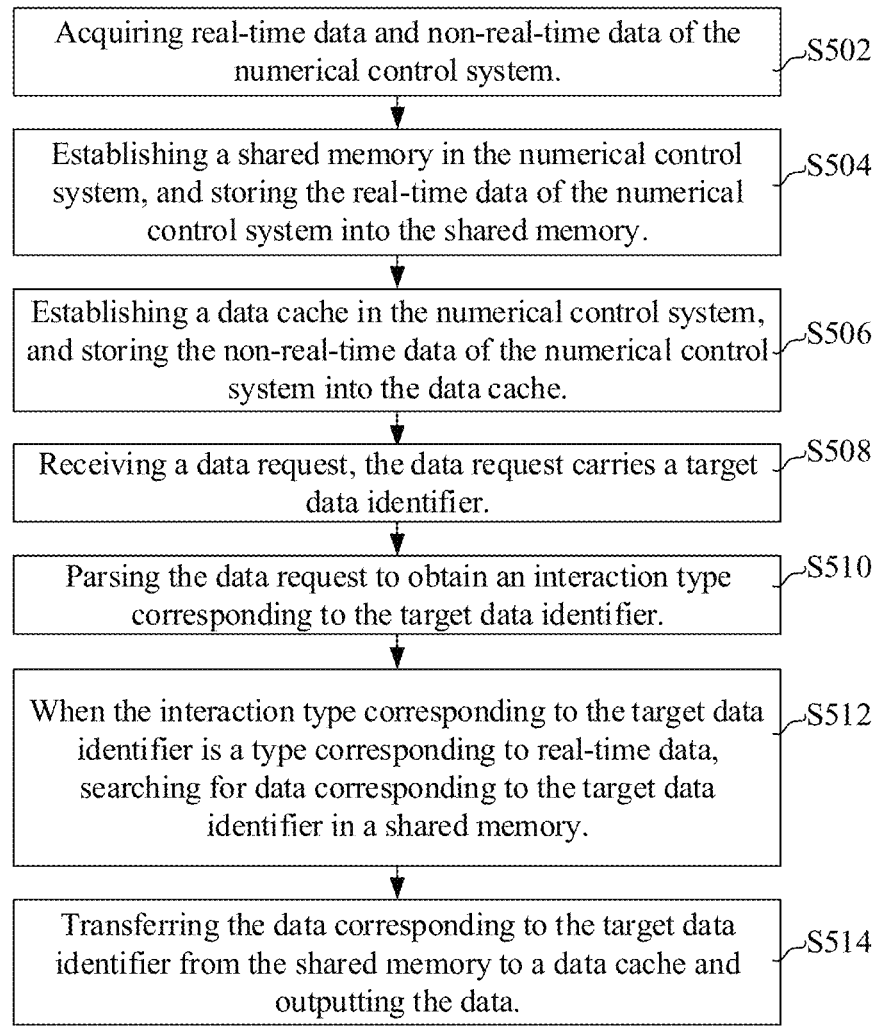
FIG. 5 is a schematic flowchart of a data processing method for a numerical control system in another embodiment.

In an embodiment, a data processing method for a numerical control system is shown in FIG. 5, before the step of receiving a data request, the method further includes: step 502, acquiring real-time data and non-real-time data of the numerical control system; step 504, establishing a shared memory in the numerical control system, and storing the real-time data of the numerical control system into the shared memory; and step 506, establishing a data cache in the numerical control system, and storing the non-real-time data of the numerical control system into the data cache.

The real-time data refers to the real-time operating data inside the numerical control system when a real-time task issued by the user is executed, such as adjusting an operating state or electrical parameters during the operation of the servo system according to processing-related real-time commands. The non-real-time data refers to the user's commands to the numerical control system, such as processing control (start processing, stop processing, pause processing, resume processing, and the like.), coordinate movement, machine parameter setting, etc. When the numerical control system is operating, a large amount of data will be generated. The data of the numerical control system is acquired, the real-time data and the non-real-time data are distinguished according to the data identifications, the real-time data is stored into the shared memory, and the non-real-time data is stored into the data cache.

Figure 6:
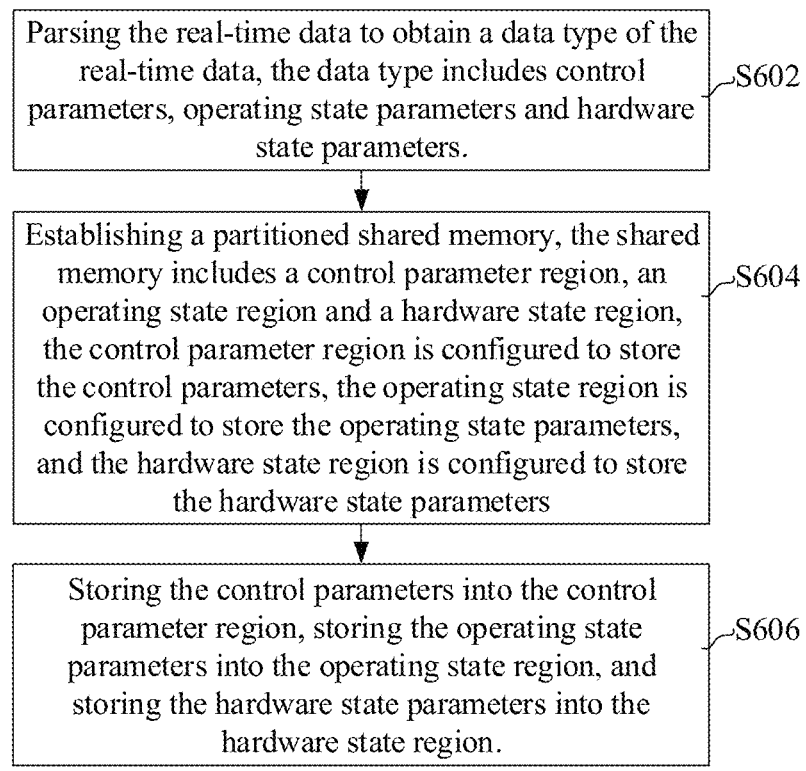
FIG. 6 is a schematic flowchart of a step of establishing a shared memory in an embodiment.

In an embodiment, as shown in FIG. 6, the step of establishing a shared memory in the numerical control system and storing the real-time data of the numerical control system into the shared memory includes: step 602, parsing the real-time data to obtain a data type of the real-time data, the data type includes control parameters, operating state parameters and hardware state parameters; step 604, establishing a partitioned shared memory, the shared memory includes a control parameter region, an operating state region and a hardware state region, the control parameter region is configured to store the control parameters, the operating state region is configured to store the operating state parameters, and the hardware state region is configured to store the hardware state parameters; step 606, storing the control parameters into the control parameter region, storing the operating state parameters into the operating state region, and storing the hardware state parameters into the hardware state region.

The control parameters are the user's control to operating mode, operating parameters, and own attributes of the machine tool, such as speed parameters, motion object parameters, stop types, and the like. The operating state parameters reflect some current operating state of the machine tool, such as processing speed, processing state, machinery coordinates, and the like. The hardware state parameters can reflect the state information input by the dedicated hardware, such as servo speed control, thermal protection state, and the like. Since the communications of the control parameters, the operating state parameters and the hardware state parameters are bidirectional, a shared memory mechanism is used for communication. The data is divided, and communication methods are selected for different types of data, various types of data can be transmitted in best communication modes, without interfering with each other, which can speed up the data transmission speed, thereby enhancing the real-time performance of the data of the numerical control system.

The operation mode of two or more threads writing to one same memory region is very risky and may cause the entire numerical control system to crash due to some uncertain factors. The establishment of the partitioned shared memory can avoid such problems. The shared memory is divided into the control parameter region, the operating state region and the hardware state region. The control parameter region is configured to store the control parameters, and the operating state region is configured to store the operating state parameters, and the hardware state region is configured to store the hardware state parameters, so that two or more threads writing to one same memory region can be avoided, thereby ensuring the safety of using the shared memory.

In an embodiment, the step of establishing a data cache in the numerical control system and storing the non-real-time data of the numerical control system into the data cache includes: establishing a data cache in the numerical control system, the data cache includes an input cache region, and storing the non-real-time data of the numerical control system into the input cache region of the data cache.

In an embodiment, establishing a data cache in the numerical control system includes: establishing a data cache in the numerical control system, the data cache includes an output cache region; and the step of transferring the data corresponding to the target data identifier from the shared memory to a data cache of the numerical control system and outputting the data includes: transferring the data corresponding to the target data identifier from the shared memory to the output cache region and outputting the data.

Figure 7:
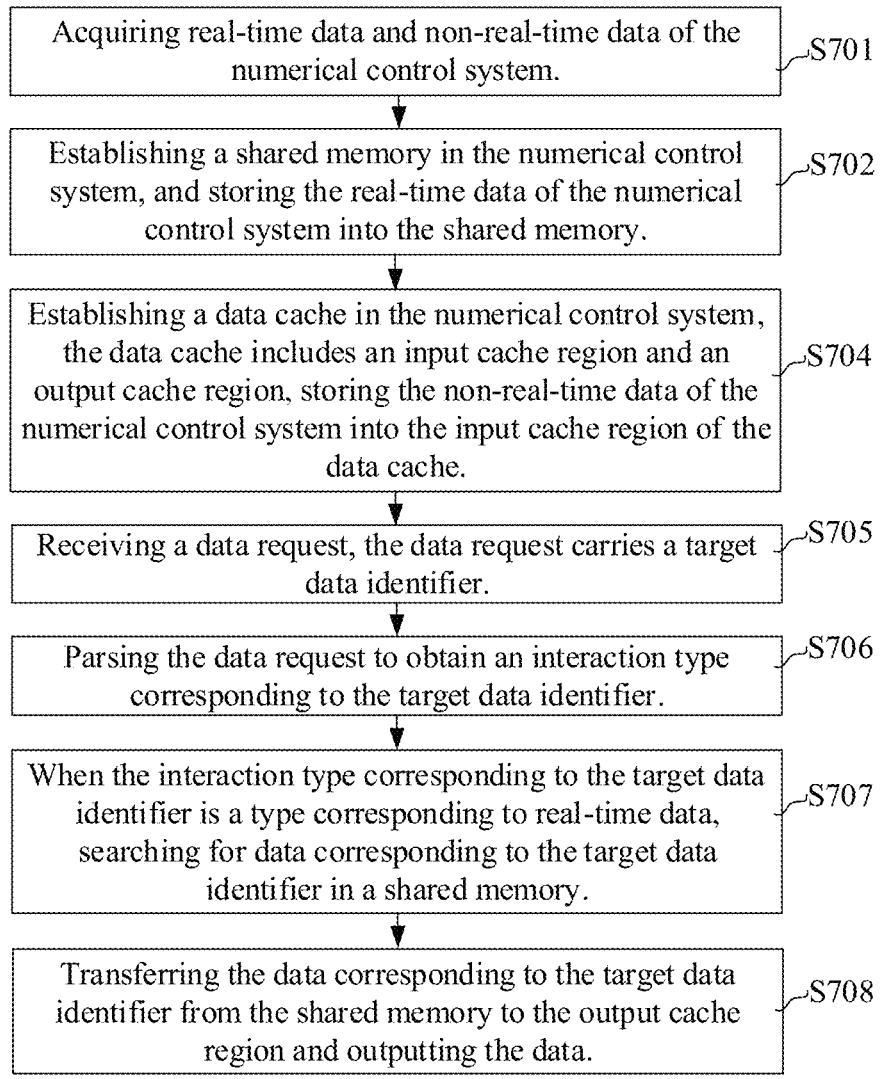
FIG. 7 is a schematic flowchart of a data processing method for a numerical control system in yet another embodiment.

In an embodiment, as shown in FIG. 7, the step of establishing a data cache in the numerical control system and storing the non-real-time data of the numerical control system into the data cache includes: step 704, establishing a data cache in the numerical control system, the data cache includes an input cache region and an output cache region, storing the non-real-time data of the numerical control system into the input cache region of the data cache; the step of transferring the data corresponding to the target data identifier from the shared memory to the data cache of the numerical control system and outputting the data includes: step 708, transferring the data corresponding to the target data identifier from the shared memory to the output cache region and outputting the data.

The data cache is divided into the input cache region and the output cache region, and the non-real-time data of the numerical control system is stored into the input cache region of the data cache. When data needs to be retrieved from the data cache, the data is retrieved from the output cache region. Receiving a data request, the data request carries a target data identifier, parsing the data request to obtain an interaction type corresponding to the target data identifier, when the interaction type corresponding to the target data identifier is a type corresponding to real-time data, searching for data corresponding to the target data identifier in a shared memory of the numerical control system, and transferring the data corresponding to the target data identifier from the shared memory to the output cache region and outputting the data. In this way, pertinence of data communication can be enhanced, data management is facilitated, and data communication can be sped up.

Taking the hardware state parameter data as an example, the hardware state parameter data can be divided into two categories, state communication data and drive communication data. The state communication data refers to state data of the dedicated hardware, which is input information. The drive communication data refers to drive data of the dedicated hardware, which is output information. The data cache is divided into two parts: the input cache region and the output cache region. The input cache region is a location in the cache region where the part of the dedicated hardware physical memory responsible for input is mapped to, and the output cache region is a location in the cache where the part of the dedicated hardware physical memory responsible for output is mapped to.

Figure 8:
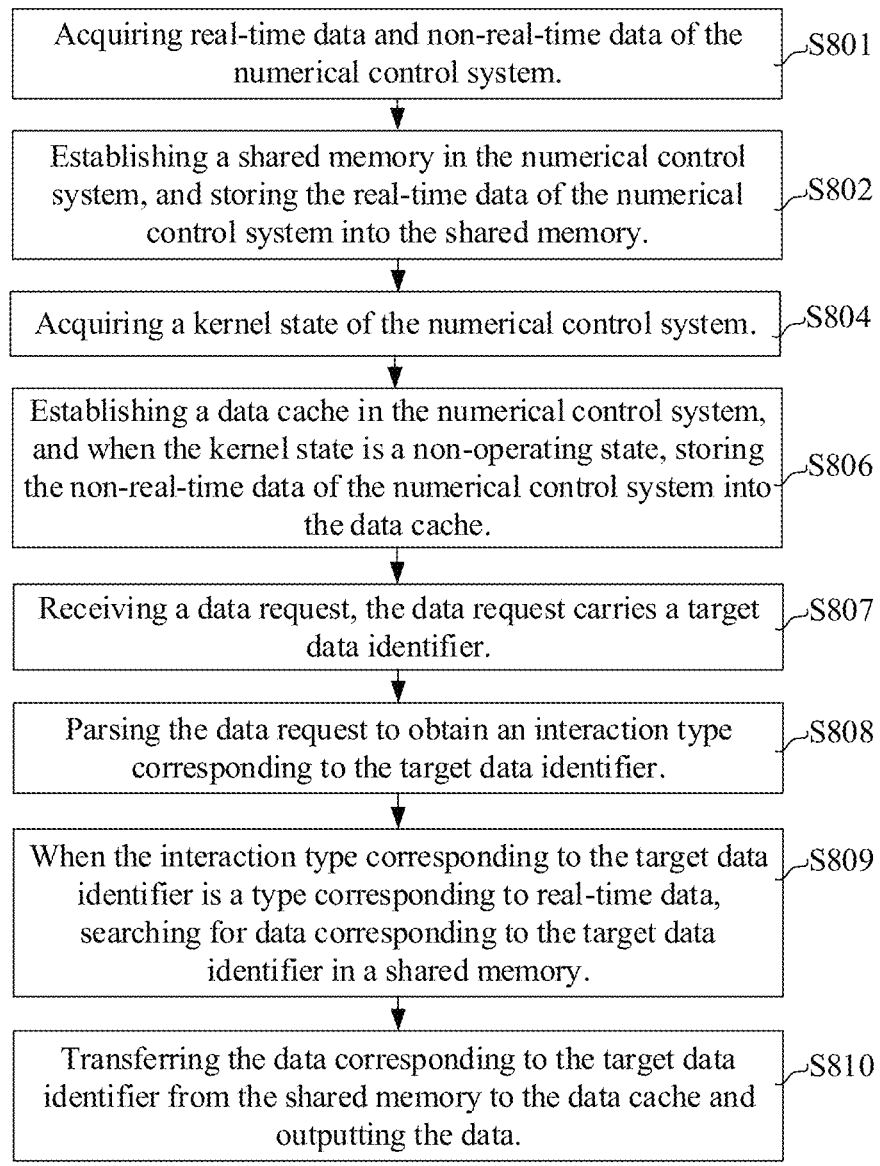
FIG. 8 is a schematic flowchart of a data processing method for a numerical control system in yet another embodiment.

In an embodiment, as shown in FIG. 8, before the step of establishing a data cache in the numerical control system and storing the non-real-time data of the numerical control system into the data cache, the method further includes: step 804, acquiring a kernel state of the numerical control system; the step of establishing a data cache in the data cache and storing the non-real-time data of the numerical control system into the data cache includes: step 806, establishing a data cache in the numerical control system, and when the kernel state is a non-operating state, storing the non-real-time data of the numerical control system into the data cache.

The kernel state of the numerical control system includes an operating state and a non-operating state. The operating state refers to that real-time data is currently being read/written, and the non-operating state refers to that no real-time data is currently being read/written. When the kernel state is the non-operating state, the non-real-time data of the numerical control system is stored into the data cache, ensuring that the priority of the real-time data is higher than that of the non-real-time data. The priority of the real-time data is greater than that of any non-real-time data. When a real-time task arrives, all running non-real-time tasks must surrender the right to use the central processing unit, and the processor will instead process this real-time task. After this real-time task has been processed, the processor continues to process the non-real-time tasks that were interrupted just now.

In an embodiment, before transferring the data corresponding to the target data identifier from the shared memory to the output cache region and outputting the data, the method further includes: establishing a data channel for communication between the shared memory and the data cache of the numerical control system, the data channel is configured to transfer the real-time data in the shared memory to the data cache; and the step of transferring the data corresponding to the target data identifier from the shared memory to the data cache of the numerical control system and outputting the data includes: transferring the data corresponding to the target data identifier from the shared memory to the data cache through the data channel and outputting the data.

Receiving a data request, the data request carries a target data identifier, parsing the data request to obtain an interaction type corresponding to the target data identifier, when the interaction type corresponding to the target data identifier is a type corresponding to real-time data, searching for data corresponding to the target data identifier in a shared memory of the numerical control system, and transferring the data corresponding to the target data identifier to the data cache of the numerical control system through the data channel and outputting the data.

In an embodiment, after the step of parsing the data request to obtain an interaction type corresponding to the target data identifier, the method further includes: when the interaction type corresponding to the target data identifier is a type corresponding to non-real-time data, extracting data corresponding to the target data identifier from the data cache of the numerical control system and outputting the data.

Receiving a data request, the data request carries a target data identifier; parsing the data request to obtain an interaction type corresponding to the target data identifier; when the interaction type corresponding to the target data identifier is a type corresponding to real-time data, transferring the data corresponding to the target data identifier from the shared memory to the data cache and outputting the data; and when the interaction type corresponding to the target data identifier is a type corresponding to non-real-time data, extracting data corresponding to the target data identifier from the data cache and outputting the data. The data is divided, and communication methods are selected for different types of data, various types of data can be transmitted in best communication modes, without interfering with each other, which can speed up the data transmission speed, thereby enhancing the real-time performance of the data of the numerical control system.

Figure 9:
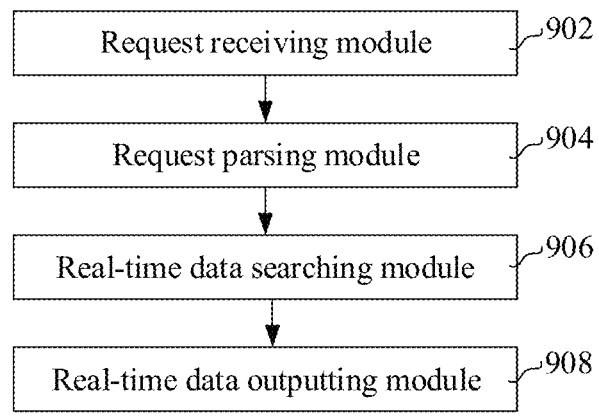
FIG. 9 is a structural block diagram of a data processing system of a numerical control system in an embodiment.

In an embodiment, as shown in FIG. 9, a data processing device for a numerical control system is provided. The device includes a request receiving module 902, a request parsing module 904, a real-time data searching module 906, and a real-time data outputting module 908. The request receiving module 902 is configured to receive a data request, the data request carries a target data identifier. The request parsing module 904 is configured to parse the data request to obtain an interaction type corresponding to the target data identifier. The real-time data searching module 906 is configured to search for data corresponding to the target data identifier in a shared memory of the numerical control system, when the interaction type corresponding to the target data identifier is a type corresponding to real-time data. The real-time data outputting module 908 is configured to transfer the data corresponding to the target data identifier from the shared memory to a data cache of the numerical control system and output the data.

In the above data processing device for a numerical control system, by parsing the data request, an interaction type corresponding to the target data identifier is obtained; when the interaction type corresponding to the target data identifier is a type corresponding to real-time data, data corresponding to the target data identifier is searched for in a shared memory of the numerical control system; and the data corresponding to the target data identifier is transferred from the shared memory to a data cache of the numerical control system and is output. The real-time data in the shared memory can be output through the data cache, in this way, the external device can acquire the real-time data located in the shared memory through the data cache, thereby improving the data openness of the numerical control system.

In an embodiment, before the request receiving module, the device further includes: a data acquiring module, configured to acquire real-time data and non-real-time data of the numerical control system; a shared memory establishing module, configured to establish a shared memory in the numerical control system, and store the real-time data of the numerical control system into the shared memory; and a data cache establishing module, configured to establish a data cache in the numerical control system, and store the non-real-time data of the numerical control system into the data cache.

In an embodiment, the shared memory establishing module includes: a real-time data parsing unit, configured to parse the real-time data to obtain a data type of the real-time data, the data type includes control parameters, operating state parameters and hardware state parameters; a shared memory partition unit, configured to establish a partitioned shared memory, the shared memory includes a control parameter region, an operating state region and a hardware state region, the control parameter region is configured to store the control parameters, the operating state region is configured to store the operating state parameters, and the hardware state region is configured to store the hardware state parameters; and a storage unit, configured to store the control parameters into the control parameter region, store the operating state parameters into the operating state region, and store the hardware state parameters into the hardware state region.

In an embodiment, the data cache establishing module is configured to establish a data cache in the numerical control system, the data cache includes an input cache region, and store the non-real-time data of the numerical control system into the input cache region of the data cache.

In an embodiment, the data cache establishing module is configured to establish a data cache in the numerical control system, the data cache includes an output cache region; and the real-time data outputting module is configured to transfer the data corresponding to the target data identifier from the shared memory to the output cache region and output the data.

In an embodiment, before the data cache establishing module, the device further includes: a kernel state acquiring module, configured to acquire a kernel state of the numerical control system; and the data cache establishing module is configured to establish a data cache in the numerical control system, and when the kernel state is a non-operating state, store the non-real-time data of the numerical control system into the data cache.

In an embodiment, before the real-time data outputting module, the device further includes: a data channel establishing module, configured to establish a data channel for communication between the shared memory and the data cache of the numerical control system, the data channel is configured to transfer the real-time data in the shared memory to the data cache; and the real-time data outputting module is configured to transfer the data corresponding to the target data identifier from the shared memory to the data cache through the data channel and output the data.

In an embodiment, after the request parsing module, the device further includes: a non-real-time data outputting module, configured to extract data corresponding to the target data identifier from the data cache of the numerical control system, when the interaction type corresponding to the target data identifier is the type corresponding to the non-real-time data.

For the specific limitation of the data processing system of a numerical control system, reference may be made to the above limitation on the data processing method for a numerical control system, which will not be repeated here. Each of the above modules in the data processing system of a numerical control system may be implemented in whole or in part by software, hardware and combinations thereof. Each of the above modules may be embedded in or independent of a processor in a computer device in hardware forms, or may be stored in the memory of the computer device in software forms, so that the processor can invoke and execute the operations corresponding to each of the above modules.

Figure 10:
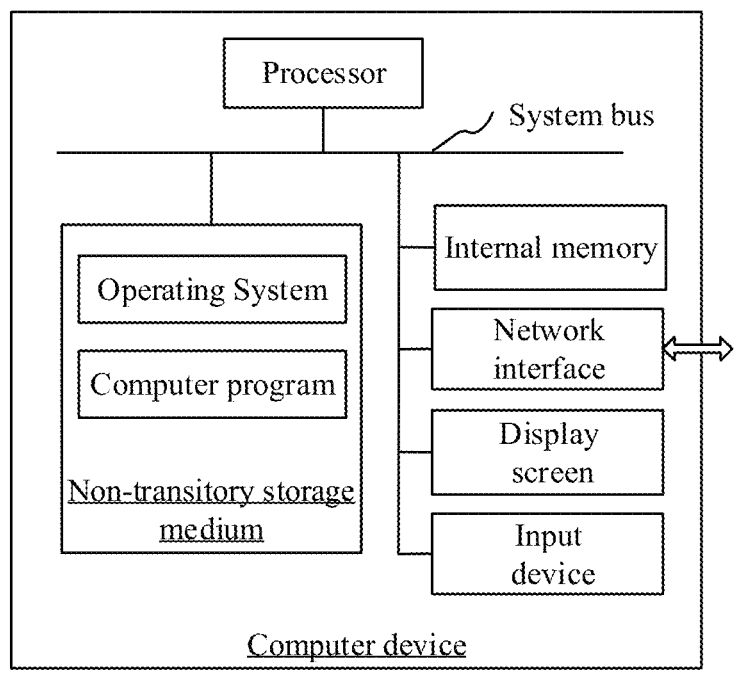
FIG. 10 is a structural block diagram of a computer device in an embodiment.

In an embodiment, a computer device is provided, and its internal structure diagram may be as shown in FIG. 10. The computer device includes a processor, a memory, a network interface, a display screen, and an input device connected by a system bus. The processor of the computer device is configured to provide computing and control capabilities. The memory of the computer device includes a non-transitory storage medium and an internal memory. The non-transitory storage medium is stored with an operating system and a computer program. The internal memory provides an environment for the operations of the operating system and the computer program in the non-transitory storage medium. The network interface of the computer device is configured to communicate with an external terminal via a network connection. When the computer program is executed by the processor, the data processing method for a numerical control system is implemented. The display screen of the computer device may be a liquid crystal display screen or an electronic ink display screen, and the input device of the computer device may be a touch layer covered on the display screen, or may be a button, a trackball, or a touchpad provided on a housing of the computer device, and may also be an external keyboard, touchpad, mouse, or the like.

It will be understood by those skilled in the art that the structure shown in FIG. 10 is only a block diagram of a part of the structure related to the solution of the present disclosure, and does not constitute a limitation of the electronic device to which the solution of the present disclosure is applied. The specific electronic device may include more or fewer components than those shown in the figure, or combine some components, or have different component arrangements.

In an embodiment, a computer device is provided, the computer device includes a processor and a memory, the memory stores computer readable instructions, when the computer readable instructions are executed by the processor, causes the processor to perform the following steps: receiving a data request, the data request carrying a target data identifier; parsing the data request to obtain an interaction type corresponding to the target data identifier; searching for data corresponding to the target data identifier in a shared memory of the numerical control system, when the interaction type corresponding to the target data identifier is a type corresponding to real-time data; and transferring the data corresponding to the target data identifier from the shared memory to a data cache of the numerical control system and outputting the data.

In an embodiment, the computer readable instructions further causes the processor to perform the following steps: acquiring real-time data and non-real-time data of the numerical control system; establishing a shared memory in the numerical control system, and storing the real-time data of the numerical control system into the shared memory; establishing a data cache in the numerical control system, and storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to a data cache and outputting the data.

In an embodiment, the computer readable instructions further causes the processor to perform the following steps: acquiring real-time data and non-real-time data of the numerical control system; parsing the real-time data to obtain a data type of the real-time data, the data type includes control parameters, operating state parameters and hardware state parameters; establishing a partitioned shared memory, the shared memory includes a control parameter region, an operating state region and a hardware state region, the control parameter region is configured to store the control parameters, the operating state region is configured to store the operating state parameters, and the hardware state region is configured to store the hardware state parameters; storing the control parameters into the control parameter region, storing the operating state parameters into the operating state region, and storing the hardware state parameters into the hardware state region; establishing a data cache in the numerical control system, and storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to a data cache and outputting the data.

In an embodiment, the computer readable instructions further causes the processor to perform the following steps: acquiring real-time data and non-real-time data of the numerical control system; establishing a shared memory in the numerical control system, and storing the real-time data of the numerical control system into the shared memory; establishing a data cache in the numerical control system, the data cache includes an input cache region, and storing the non-real-time data of the numerical control system into the input cache region of the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to a data cache and outputting the data.

In an embodiment, the computer readable instructions further causes the processor to perform the following steps: acquiring real-time data and non-real-time data of the numerical control system; establishing a shared memory in the numerical control system, and storing the real-time data of the numerical control system into the shared memory; establishing a data cache in the numerical control system, the data cache includes an output cache region, and storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to the output cache region and outputting the data.

In an embodiment, the computer readable instructions further causes the processor to perform the following steps: acquiring real-time data and non-real-time data of the numerical control system; establishing a shared memory in the numerical control system, and storing the real-time data of the numerical control system into the shared memory; acquiring a kernel state of the numerical control system, establishing a data cache in the numerical control system, and when the kernel state is a non-operating state, storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to a data cache and outputting the data.

In an embodiment, the computer readable instructions further causes the processor to perform the following steps: receiving a data request, the data request carries a target data identifier; parsing the data request to obtain an interaction type corresponding to the target data identifier; when the interaction type corresponding to the target data identifier is a type corresponding to real-time data, searching for data corresponding to the target data identifier in a shared memory of the numerical control system; establishing a data channel for communication between the shared memory and the data cache of the numerical control system, the data channel is configured to transfer the real-time data in the shared memory to the data cache; and transferring the data corresponding to the target data identifier from the shared memory to the data cache through the data channel and outputting the data.

In an embodiment, the computer readable instructions further causes the processor to perform the following steps: receiving a data request, the data request carries a target data identifier; parsing the data request to obtain an interaction type corresponding to the target data identifier; when the interaction type corresponding to the target data identifier is a type corresponding to real-time data, searching for data corresponding to the target data identifier in a shared memory of the numerical control system; transferring the data corresponding to the target data identifier from the shared memory to the data cache of the numerical control system and outputting the data; and when the interaction type corresponding to the target data identifier is a type corresponding to non-real-time data, extracting data corresponding to the target data identifier from the data cache and outputting the data.

In an embodiment, one or more non-transitory storage mediums storing computer-readable instructions are provided, when the computer-readable instructions are executed by one or more processors, the one or more processors are caused to perform the following steps: receiving a data request, the data request carrying a target data identifier; parsing the data request to obtain an interaction type corresponding to the target data identifier; searching for data corresponding to the target data identifier in a shared memory of the numerical control system, when the interaction type corresponding to the target data identifier is a type corresponding to real-time data; and transferring the data corresponding to the target data identifier from the shared memory to a data cache of the numerical control system and outputting the data.

In an embodiment, when the computer-readable instructions are executed by the one or more processors, the one or more processors are caused to perform the following steps: acquiring real-time data and non-real-time data of the numerical control system; establishing a shared memory in the numerical control system, and storing the real-time data of the numerical control system into the shared memory; establishing a data cache in the numerical control system, and storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is the type corresponding to the real-time data; and transferring the data corresponding to the target data identifier from the shared memory to a data cache and outputting the data.

In an embodiment, when the computer-readable instructions are executed by the one or more processors, the one or more processors are caused to perform the following steps: acquiring real-time data and non-real-time data of the numerical control system; parsing the real-time data to obtain a data type of the real-time data, the data type includes control parameters, operating state parameters and hardware state parameters; establishing a partitioned shared memory, the shared memory includes a control parameter region, an operating state region and a hardware state region, the control parameter region is configured to store the control parameters, the operating state region is configured to store the operating state parameters, and the hardware state region is configured to store the hardware state parameters; storing the control parameters into the control parameter region, storing the operating state parameters into the operating state region, and storing the hardware state parameters into the hardware state region; establishing a data cache in the numerical control system, and storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is the type corresponding to the real-time data; and transferring the data corresponding to the target data identifier from the shared memory to a data cache and outputting the data.

In an embodiment, when the computer-readable instructions are executed by the one or more processors, the one or more processors are caused to perform the following steps: acquiring real-time data and non-real-time data of the numerical control system; establishing a shared memory in the numerical control system, and storing the real-time data of the numerical control system into the shared memory; establishing a data cache in the numerical control system, the data cache includes an input cache region, and storing the non-real-time data of the numerical control system into the input cache region; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to a data cache and outputting the data.

In an embodiment, when the computer-readable instructions are executed by the one or more processors, the one or more processors are caused to perform the following steps: acquiring real-time data and non-real-time data of the numerical control system; establishing a shared memory in the numerical control system, and storing the real-time data of the numerical control system into the shared memory; establishing a data cache in the numerical control system, the data cache includes an output cache region, and storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to the output cache region and outputting the data.

In an embodiment, when the computer-readable instructions are executed by the one or more processors, the one or more processors are caused to perform the following steps: acquiring real-time data and non-real-time data of the numerical control system; establishing a shared memory in the numerical control system, and storing the real-time data of the numerical control system into the shared memory; acquiring a kernel state of the numerical control system, establishing a data cache in the numerical control system, and when the kernel state is a non-operating state, storing the non-real-time data of the numerical control system into the data cache; receiving a data request, the data request carrying a target data identifier; parsing the data request to obtain an interaction type corresponding to the target data identifier; searching for data corresponding to the target data identifier in a shared memory, when the interaction type corresponding to the target data identifier is a type corresponding to real-time data; and transferring the data corresponding to the target data identifier from the shared memory to a data cache and outputting the data.

In an embodiment, when the computer-readable instructions are executed by the one or more processors, the one or more processors are caused to perform the following steps: receiving a data request, the data request carries a target data identifier; parsing the data request to obtain an interaction type corresponding to the target data identifier; when the interaction type corresponding to the target data identifier is a type corresponding to real-time data, searching for data corresponding to the target data identifier in a shared memory of the numerical control system; establishing a data channel for communication between the shared memory and the data cache of the numerical control system, the data channel is configured to transfer the real-time data in the shared memory to the data cache; and transferring the data corresponding to the target data identifier from the shared memory to the data cache through the data channel and outputting the data.

In an embodiment, when the computer-readable instructions are executed by the one or more processors, the one or more processors are caused to perform the following steps: receiving a data request, the data request carries a target data identifier; parsing the data request to obtain an interaction type corresponding to the target data identifier; when the interaction type corresponding to the target data identifier is a type corresponding to real-time data, searching for data corresponding to the target data identifier in a shared memory of the numerical control system; transferring the data corresponding to the target data identifier from the shared memory to the data cache of the numerical control system and outputting the data; and when the interaction type corresponding to the target data identifier is a type corresponding to non-real-time data, extracting data corresponding to the target data identifier from the data cache and outputting the data.

It should be understood that the various steps in the embodiments of the present disclosure are not necessarily performed in the order indicated by the step numbers. Unless clearly stated in the present specification, the execution of these steps is not strictly limited in order, and these steps can be executed in other orders. Moreover, at least part of the steps in the embodiments may comprise a plurality of sub-steps or phases, which are not necessary to be performed simultaneously, but may be performed at different times, and for the performing order thereof, it is not necessary to be performed sequentially, but may be performed by turns or alternately with other steps or sub-steps of other steps or at least part of the phases.

Those of ordinary skill in the art may understand that all or part of the processes in the method of the above embodiments may be completed by instructing relevant hardware by the computer program, and the computer program may be stored in a non-transitory computer readable storage medium. When the computer program is executed, the processes of the above methods in the embodiments may be included. Any reference to the memory, the storage, the database or other medium used in various embodiments provided in the present disclosure may include a non-transitory memory and/or a transitory memory. The non-transitory memory may include a Read Only Memory (ROM), a Programmable ROM (PROM), an Electrically Programmable ROM (EPROM), an Electrically Erasable Programmable ROM (EEPROM) or a flash memory. The transitory memory may include a Random Access Memory (RAM) or an external cache memory. As illustration rather than limitation, a RAM is available in a variety of forms, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), a Rambus Dynamic RAM (RDRAM), and the like.

The technical features of the above embodiments can be combined arbitrarily. To simplify the description, not all possible combinations of the technical features in the above embodiments are described. However, all of the combinations of these technical features should be considered as within the scope of this disclosure, as long as such combinations do not contradict with each other.

The above-described embodiments merely represent several embodiments of the present disclosure, and the description thereof is more specific and detailed, but it should not be construed as limiting the scope of the present disclosure. It should be noted that for those of ordinary skill in the art, without departing from the concept of this disclosure, several modifications and improvements can be made, which are all within the protection scope of this disclosure. Therefore, the protection scope of the present disclosure shall be subject to the appended claims.

What is claimed is:

1. A data processing method for a numerical control system, comprising:
   receiving a data request, the data request carrying a target data identifier;
   parsing the data request to obtain an interaction type corresponding to the target data identifier;
   searching for data corresponding to the target data identifier in a shared memory of the numerical control system, when the interaction type corresponding to the target data identifier is a type corresponding to real-time data; and
   transferring the data corresponding to the target data identifier from the shared memory to a data cache of the numerical control system and outputting the data,
   wherein before receiving the data request, the method further comprises:
   acquiring real-time data and non-real-time data of the numerical control system;
   establishing a shared memory in the numerical control system, and storing the real-time data of the numerical control system into the shared memory; and
   establishing a data cache in the numerical control system, and storing the non-real-time data of the numerical control system into the data cache.

2. The method of claim 1, wherein the establishing a shared memory in the numerical control system, and storing the real-time data of the numerical control system into the shared memory comprises:
   parsing the real-time data to obtain a data type of the real-time data, the data type comprising control parameters, operating state parameters and hardware state parameters;
   establishing the partitioned shared memory, the shared memory comprising a control parameter region, an operating state region and a hardware state region, the control parameter region being configured to store the control parameters, the operating state region being configured to store the operating state parameters, and the hardware state region being configured to store the hardware state parameters; and
   storing the control parameters into the control parameter region, storing the operating state parameters into the operating state region, and storing the hardware state parameters into the hardware state region.

3. The method of claim 1, wherein the establishing a data cache in the numerical control system, and storing the non-real-time data of the numerical control system into the data cache comprises:
   establishing the data cache in the numerical control system, the data cache comprising an input cache region, and storing the non-real-time data of the numerical control system into the input cache region.

4. The method of claim 1, wherein the establishing a data cache in the numerical control system comprises:
   establishing the data cache in the numerical control system, the data cache comprising an output cache region;
   wherein the transferring the data corresponding to the target data identifier from the shared memory to the data cache of the numerical control system and outputting the data comprises:

transferring the data corresponding to the target data identifier from the shared memory to the output cache region and outputting the data.

5. The method of claim 1, wherein before establishing a data cache in the numerical control system and storing the non-real-time data of the numerical control system into the data cache, the method further comprises:
acquiring a kernel state of the numerical control system;
wherein the establishing the data cache in the numerical control system and storing the non-real-time data of the numerical control system into the data cache comprises:
establishing the data cache in the numerical control system, and when the kernel state is a non-operating state, storing the non-real-time data of the numerical control system into the data cache.

6. The method of claim 1, wherein before transferring the data corresponding to the target data identifier from the shared memory to the data cache of the numerical control system and outputting the data, the method further comprises:
establishing a data channel for communication between the shared memory and the data cache of the numerical control system, the data channel being configured to transfer the real-time data in the shared memory to the data cache;
wherein the transferring the data corresponding to the target data identifier from the shared memory to a data cache of the numerical control system and outputting the data comprises:
transferring the data corresponding to the target data identifier from the shared memory to the data cache of the numerical control system through the data channel and outputting the data.

7. The method of claim 1, wherein after parsing the data request to obtain the interaction type corresponding to the target data identifier, the method further comprises:
when the interaction type corresponding to the target data identifier is a type corresponding to non-real-time data, extracting data corresponding to the target data identifier from the data cache of the numerical control system and outputting the data.

8. A computer device, comprising a processor and a memory storing computer readable instructions, which, when executed by the processor, causes the processor to perform steps comprising:
receiving a data request, the data request carrying a target data identifier;
parsing the data request to obtain an interaction type corresponding to the target data identifier;
searching for data corresponding to the target data identifier in a shared memory of the numerical control system, when the interaction type corresponding to the target data identifier is a type corresponding to real-time data; and
transferring the data corresponding to the target data identifier from the shared memory to a data cache of the numerical control system and output the data,
wherein the computer readable instructions further cause the processor to perform the following steps:
acquiring real-time data and non-real-time data of the numerical control system;
establishing the shared memory in the numerical control system, and storing the real-time data of the numerical control system into the shared memory; and
establishing the data cache in the numerical control system, and storing the non-real-time data of the numerical control system into the data cache.

9. The computer device of claim 8, wherein the computer readable instructions further cause the processor to perform the following steps:
parsing the real-time data to obtain a data type of the real-time data, the data type comprising control parameters, operating state parameters and hardware state parameters;
establishing the partitioned shared memory, the shared memory comprising a control parameter region, an operating state region and a hardware state region, the control parameter region being configured to store the control parameters, the operating state region being configured to store the operating state parameters, and the hardware state region being configured to store the hardware state parameters; and
storing the control parameters into the control parameter region, storing the operating state parameters into the operating state region, and storing the hardware state parameters into the hardware state region.

10. The computer device of claim 8, wherein the computer readable instructions further cause the processor to perform the following steps:
establishing the data cache in the numerical control system, the data cache comprising an input cache region, and storing the non-real-time data of the numerical control system into the input cache region.

11. The computer device of claim 8, wherein the computer readable instructions further cause the processor to perform the following steps:
establishing the data cache in the numerical control system, the data cache comprising an output cache region; and
transferring the data corresponding to the target data identifier from the shared memory to the output cache region and outputting the data.

12. The computer device of claim 8, wherein the computer readable instructions further causes the processor to perform the following steps:
establishing a data channel for communication between the shared memory and the data cache of the numerical control system, the data channel being configured to transfer the real-time data in the shared memory to the data cache; and
transferring the data corresponding to the target data identifier from the shared memory to the data cache through the data channel and outputting the data.

13. The computer device of claim 8, wherein, the computer readable instructions further causes the processor to perform the following steps:
when the interaction type corresponding to the target data identifier is a type corresponding to non-real-time data, extracting data corresponding to the target data identifier from the data cache of the numerical control system and outputting the data.

14. One or more non-transitory storage mediums storing computer-readable instructions, when the computer-readable instructions are executed by one or more processors, the one or more processors are caused to perform the following steps:
receiving a data request, the data request carrying a target data identifier;
parsing the data request to obtain an interaction type corresponding to the target data identifier;
searching for data corresponding to the target data identifier in a shared memory of the numerical control system, when the interaction type corresponding to the target data identifier is a type corresponding to real-time data; and transferring the data corresponding to the target data identifier from the shared memory to a data cache of the numerical control system and output the data, wherein when the computer-readable instructions are executed by the one or more processors, the one or more processors are caused to perform the following steps:

acquiring real-time data and non-real-time data of the numerical control system;

establishing the shared memory in the numerical control system, and storing the real-time data of the numerical control system into the shared memory; and establishing the data cache in the numerical control system, and storing the non-real-time data of the numerical control system into the data cache.

15. The storage medium of claim 14, wherein when the computer-readable instructions are executed by the one or more processors, the one or more processors are caused to perform the following steps:

parsing the real-time data to obtain a data type of the real-time data, the data type comprising control parameters, operating state parameters and hardware state parameters;

establishing the partitioned shared memory, the shared memory comprising a control parameter region, an operating state region and a hardware state region, the control parameter region being configured to store the control parameters, the operating state region being configured to store the operating state parameters, and the hardware state region being configured to store the hardware state parameters; and storing the control parameters into the control parameter region, storing the operating state parameters into the operating state region, and storing the hardware state parameters into the hardware state region.

16. The storage medium of claim 14, wherein when the computer-readable instructions are executed by the one or more processors, the one or more processors are caused to perform the following steps:

establishing the data cache in the numerical control system, the data cache comprising an input cache region, and storing the non-real-time data of the numerical control system into the input cache region.

17. The storage medium of claim 14, wherein when the computer-readable instructions are executed by the one or more processors, the one or more processors are caused to perform the following steps:

establishing the data cache in the numerical control system, the data cache comprising an output cache region; and transferring the data corresponding to the target data identifier from the shared memory to the output cache area and outputting the data.

* * * * *